United States Patent [19]
Cole et al.

[11] 3,883,636
[45] May 13, 1975

[54] CHLORINATION PROCESS

[75] Inventors: Colin Francis Cole; Kenneth Arkless, both of Teeside, England

[73] Assignee: British Titan Limited, Billingham, Teeside, England

[22] Filed: Jan. 24, 1973

[21] Appl. No.: 326,415

Related U.S. Application Data

[63] Continuation-in-part of Ser. No. 321,969, Jan. 8, 1973, abandoned, which is a continuation of Ser. No. 775,906, Nov. 14, 1969, abandoned.

[30] Foreign Application Priority Data

Nov. 17, 1967 United Kingdom............... 52511/67

[52] U.S. Cl. ..................... 423/74; 423/76; 423/79; 423/492
[51] Int. Cl............................................. C01g 23/02
[58] Field of Search ................. 423/74, 76, 79, 492

[56] References Cited
UNITED STATES PATENTS 2,868,622   1/1959   Bennett et al. ...................... 423/74
2,974,009   3/1961   Bachour et al. ..................... 423/74
3,591,333   7/1971   Carlson et al........................ 423/74

OTHER PUBLICATIONS

"Table of Periodic Properties of the Elements", Side 2, 1968, Chart of Sargent-Welch, Sargent-Welch Scientific Co., Chicago, Il.

Primary Examiner—Edward Stern
Attorney, Agent, or Firm—Schuyler, Birch, Swindler, McKie & Beckett

[57] ABSTRACT

An improved process for the chlorination of a finely divided titaniferous material in a fluidized bed in the presence of a carbonaceous reducing agent which comprises conducting the chlorination in the presence of an added source selected from sources of chromium, lanthanum, vanadium and potassium. An auxiliary added source selected from sources of calcium, manganese and cerium may also be added to further improve the reaction.

17 Claims, No Drawings

CHLORINATION PROCESS

REFERENCE TO RELATED APPLICATION

This application is a continuation-in-part of copending application Ser. No. 321,969, filed Jan. 8, 1973, which is a continuation of application Ser. No. 775,906, filed Nov. 14, 1969, now abandoned. Said application Ser. No. 321,969 now also has been abandoned.

BACKGROUND OF THE INVENTION

1. Field of the Invention

This invention relates to the chlorination of finely divided titaniferous materials in a fluidized bed and more particularly to a titaniferous material such as mineral rutile containing not less than 85% titanium dioxide.

2. Description of the Prior Art

The chlorination of titaniferous materials in a fluidized bed at 800°C to 1,400°C has been in successful commercial use for some time, this fluidized bed process is generally carried out by passing chlorine or a chlorine-containing gas through a fluidized bed containing the titaniferous material and a carbonaceous reducing agent. On a commercial scale the process may be carried out autothermally since the reaction is exothermic, the exothermicity being proportional to the ratio of $CO_2$ to $CO$ produced by reaction of carbon with oxygen content of titaniferous material. The titaniferous material chlorinated has usually had a particle size range of 80–180 microns.

An inadequate rate of chlorination may be observed, especially when the titaniferous material has a substantial proportion of its particles of size greataer than 180 microns. (The reactivity of the titaniferous material to chlorine is apparently related to its specific surface area, and hence to its particle size.) Also the ratio of carbon dioxide to carbon monoxide in the effluent gases is in these cases found to be substantially decreased leading to a reduction in exothermicity, with the result that the reaction tends to be less self-sustaining, and the degree of freedom to control the reaction at a desired reaction temperature is reduced on a commercial scale.

It would be highly desirable to chlorinate a titaniferous material in a fluidized bed process in such manner that the reaction is self-sustaining.

It would be further desirable to chlorinate a titaniferous material in a fluidized bed process wherein a substantial proportion of the material has a particle size in excess of 180 microns.

It is an object of this invention to provide a process for the chlorination of a titaniferous material in a fluidized bed which process is characterized by an increased rate of chlorination and usually a higher degree of exothermicity.

It is a further object of this invention to provide a process for the chlorination of a titaniferous material in a fluidized bed wherein a major proportion of the titaniferous material has a particle size greater than 180 microns and the reaction is characterized by an increased rate of chlorination and usually a higher degree of exothermicity.

SUMMARY OF THE INVENTION

The present invention provides a process which comprises the chlorination of finely divided titaniferous materials in a fluidized bed in the presence of a carbonaceous reducing agent and in the presence of an added source of potassium, chromium, lanthanum or vanadium. It has been found that the presence of an added source of potassium, chromium, lanthanum or vanadium increases the rate of chlorination of the titaniferous material considerably and usually produces a higher degree of exothermicity permitting adequate control over the reaction temperature to be attained.

The titaniferous materials chlorinated according to the process of the present invention are usually those in which a substantial proportion of the material has a particle size in excess of 180 microns and the invention is particularly concerned with titaniferous materials having at least 30% by weight of the particles present in the fluidized bed of a size greater than 180 microns. The process of the invention is of particularly great value where at least 40 percent by weight of the titaniferous particles present in the fluidized bed have a size greater than 180 microns, for instance in the range 180–400 microns. The process of the invention can be carried out with benefit using a titaniferous material having a mean particle size less than 180 microns if desired, such as a material containing few or even no particles of size greater than 180 microns. Preferably the titaniferous materials should contain at least 85 percent of titanium dioxide and the preferred titaniferous material is mineral rutile having a substantial proportion of its particles of size greater than 180 microns.

The chlorination is carried out under such conditions that the titaniferous material is maintained in a fluidized condition in a suitable apparatus, i.e. the titaniferous material together with the reducing agent used (when the latter is a solid) forms a fluidized bed. The bed can be fluidized by the chlorine or chlorine-containing gas used to effect the chlorination of the titaniferous material and, in addition can be mixed with an inert gas to assist the fluidizing process, if desired. Preferably undiluted chlorine is used to effect the chlorination of the titaniferous material and the rate of flow of chlorine through the bed will depend on the size and depth of the bed and on the temperature at which the reaction is performed.

The reaction can be carried out at a temperature of, say, from 800°C to 1400°C but preferably from 850°C to 1000°C.

The reducing agent is carbonaceous, suitably a solid form of carbon having a suitable particle size for fluidization when mixed with the titaniferous material, and is preferably coke. It is, however, possible to use a gaseous reducing agent. Among the suitable carbonaceous reducing agents are those solid and gaseous carbonaceous reducing agents disclosed in U.S. Pats. No. 2,928,724 and 3,074,777. A mixture of the titaniferous material and the reducing agent when solid can be continuously added to the fluidized bed during the course of the reaction to permit continuous chlorination to take place although it may be necessary to remove inert impurities which build up in the bed and which may reduce the efficiency of chlorination considerably.

The added source of potassium, chromium, lanthanum or vanadium can be any suitable individual, mixed or combined source and can be, where convenient, an ore, a compound or element which can be added to the fluidized bed in the desired amount. Typical sources of the additives are for example potassium chloride, potassium carbonate, potassium chromate, chromic oxide, chromite ore, chromium sulphate, lanthanum oxide, monazite and vanadium oxide. Preferably the additive is a source of chromium such as chromite ore.

The amount of the additive used depends to some extent on the particular additive employed and should be desirably the smallest amount necessary to give the chosen desirable effect. Amounts from 0.01 to 2.5 percent, preferably 0.025 to 1.0 percent by weight expressed as the additive element based on the weight of titanium dioxide in the titaniferous material have been found to be suitable although it is to be expected that amounts outside this range can also be conveniently employed. A preferred addition is from 0.02 to 0.5 percent chromium in the form of chromite ore.

Some titaniferous materials contain vanadium or chromium as impurities and when such materials are chlorinated according to the process of the present invention then the amount of additive used is calculated without regard to the existing impurity content of the titaniferous material.

It is further advantageous to use in conjunction with the above mentioned added sources of chromium, lanthanum, vanadium or potassium an auxilliary added source of manganese, cerium or calcium. These auxiliary added sources enhance the catalytic activity of the main additives and appear to act as catalytic promoters. The amount of auxiliary added material added depends on the particular auxiliary material added and is generally from 0.01 to 2.5 percent, preferably 0.01 to 0.5 percent expressed as the additive element based on the weight of the titanium dioxide in the titaniferous material. In a more preferred embodiment, the amount of auxiliary source element added is from 0.1 to 0.25 percent.

The additive can be added directly as a solid to the bed of fluidized particles or to the particles before fluidization takes place, or in appropriate cases, the titaniferous material can be treated with the additive in liquid form, e.g. as a solution, prior to formation of the bed and then dried before chlorination is effected. In some cases the additive, in equivalent amount, can be added as a vapor in the fluidizing gas. The addition of the additive as a dry solid is, of course, the simplest method of the three and the easiest to preform from the point of view of controlling the proportion.

As indicated previously the additives appear to act as catalysts or promoters to increase the rate of chlorination of the titaniferous material according to the present invention and, as a result, more efficient use of the chlorine is achieved. In addition the reaction is maintained in an exothermic condition such that it can maintain itself at the desired reaction temperature without the introduction of additional heat after the initial preheating to the reaction temperature has taken place. The consumption of carbon may be reduced and the commercial utility enhanced.

Any suitable type of apparatus to contain the fluidized bed can be employed. The gases emanating from the fluidized bed, principally composed of titanium tetrachloride, carbon dioxide and carbon monoxide, may be cooled to condense the titanium tetrachloride and separate the waste products.

The invention is illustrated in the following examples.

GENERAL CONDITIONS FOR ALL EXAMPLES

A coarse rutile fraction was employed so that the base-line chlorine efficiency curve was poor - about 50 percent at best. The rutile fraction was 180–420 microns, with a mean weight particle size of 250 microns, and an analyzed $TiO_2$ content of 95.6 percent - essentially this is the upper part of the size distribution where there is especial need to improve the chlorination characteristics.

The reactor consisted of a 1" diameter silica side-arm reactor, fitted with a base gas inlet, a sintered silica disc for gas distribution, and a sheathed thermocouple for measuring the temperature of the fluid bed. A heavily insulated tube furnace, controlled by a variac, was employed for heating the reaction tube. Gases leaving the reactor passed through the side-arm outlet, which was heated to high temperature by means of a sleeve heater to decompose species such as $COCl_2$ in the exit gas. The gas was then cooled by a water-cooled condenser, and the product collected in a small receiver. A 'T' piece in the condenser outlet was connected orsat apparatus and to a secondary receiver from which the gases were passed to vent.

In all experiments the bed consisted of 100 gm rutile fraction and 25 gm petroleum coke (means size of 470 microns).

Normally, insoluble additives such as oxides, etc., were blended with the rutile, without wetting and drying. As far as possible, such additives had the same size range as the rutile fraction.

Salt additions to the rutile were made as an aqueous solution, sufficient to wet the rutile, which was then dried carefully to prevent loss of the additive. Complete dryness was ensured by heating in an oven at 120°C for several hours.

Initially the reactor was purged with argon, and raised to the standard reaction temperature of 900°C, the side-arm being heated to 1000°C. The bed was added and fluidized with argon until its temperature reached 880°–890°C when 1.1 l.p.m. $Cl_2$ was passed and the argon rate decreased to 0.2 l.p.m. Exit gas samples were drawn into the orsat apparatus at 7–10 minute intervals and analyzed for $Cl_2$, $CO_2$, $O_2$, and $CO$. When the $Cl_2$ efficiency was about 5–10 percent the experiment was terminated and the residual bed cooled under an argon flow.

The duration of the experiment was noted, and weights were determined of the $Cl_2$ passed, and of the final bed. The latter was then waterwashed, dried, rewieghed and bromoform separated into rutile and coke fractions. Subsequently the weights of the latter fractions were determined.

$$\text{Chlorine utilization and CO ratio} \left[ \frac{\%CO}{\%CO + \%CO_2} \right] \times 100$$

were calculated from the gas analyses and mass balanced against the weight of rutile and coke lost from the bed.

In examples 2–5 the addition was made in a dry form to the rutile and blended. The comparative nonadditioned experiment was as follows in example 1.

EXAMPLE 1 - NO ADDITION

The initial bed consisted of 100 gm of 180–420 micron rutile and 25 gm petroleum coke. The duration of the experiment was 105 minutes, during which the bed temperature was maintained at 900°C and 339 gm $Cl_2$ was passed at a mean rate of 1.091 l.p.m., together with 0.205 l.p.m. argon through the reactor. The mean values of $Cl_2$ utilization and CO ratio was 37.4 percent and 59.6 percent respectively.

EXAMPLE 2 - 1.0 PERCENT CHROMITE ADDITION 1.00 gm chromite ore (48% $Cr_2O_3$) of size range 180-420 microns was added to the initial bed, and the experimental procedure and conditions of example 1 maintained throughout the experiment which was completed in 60 minutes. During this time 194 gm $Cl_2$ was passed at a mean rate of 1.092 l.p.m. Mean values of $Cl_2$ utilization and CO ratio were 68.0 percent and 46.3 percent respectively. As compared with example 1, the rate of chlorination of rutile was at least doubled in the early part of the experiment, in addition to a substantial lowering of the CO ratio.

EXAMPLE 3 - 0.5 PERCENT CHROMITE ADDITION 0.500 gm chromite ore, of size range 180-420 microns, was added to the initial bed, and the experimental procedure and conditions of example 1 maintained throughout the experiment which was complete in 70 minutes. During this time 223 gm $Cl_2$ was passed at a mean rate of 1.076 l.p.m. Mean values of $Cl_2$ utilization and CO ratio were 56.9 percent and 53.7 percent respectively. The 0.5 percent addition greatly increased the rate of chlorination and substantially lowered the CO ratio.

EXAMPLE 4 - 0.5 PERCENT VANADIUM PENTOXIDE ON KIESELGUHR 0.500 gm addition of crushed contact process (sulphuric acid) catalyst, of size range 180-420 microns, was added to the intial bed, and the experimental procedure and conditions of example 1 maintained throughout the experiment which was completed in 85 minutes. A total weight of 274 gm $Cl_2$ was passed at a mean rate of 1.089 l.p.m. Mean values of $Cl_2$ utilization and CO ratio were 51.3 percent and 60.7 percent respectively. The results indicated a good increase in rate of chlorination over the duration of the experiment, and a lowering of the CO ratio in the initial stages.

EXAMPLE 5

The initial bed consisted of 100 grams of rutile having a mean particle size of 190 microns and 25 grams of petroleum coke in each of the following experiments. The reaction temperature of 960°C was maintained while a mixture of 1.1 litres per minute of chlorine gas and 0.205 litres per minute of argon were passed through the bed. The following Table gives the experimental conditions and the results obtained:

| Addition to rutile | Duration minutes | Weight of chlorine gas passed grams | Mean values | |
|---|---|---|---|---|
| | | | $Cl_2$ utilization % | CO ratio % |
| Nil | 59 | 198 | 73.0 | 55.4 |
| 0.5% | 50 | 167 | 80.2 | 48.6 |
| 0.5% chromite plus 0.1% CaO | 47 | 157 | 80.7 | 43.2 |

It will be seen from the above results that the chlorination rate was only slightly improved by the addition of calcium oxide to the chromite but that a substantial gain was nevertheless obtained in that the reaction became much more exothermic. However, calcium oxide alone had no appreciable effect on either property.

In examples 7-10, the additions were made as aqueous solution to the rutile, as previously described. The comparative experiment was as follows in example 6.

EXAMPLE 6 - WATER ADDITION

The amount of water, employed when salt additioning in examples 7-10, was added to the rutile and removed by drying before the reaction.

The experimental procedure and conditions of example 1 were maintained throughout the experiment lasting 93 minutes, during which 299 gm $Cl_2$ was passed at a mean rate of 1.086 l.p.m. Mean values of $Cl_2$ utilization and CO ratio were 41.0 percent and 58.7 percent respectively.

EXAMPLE 7 - 0.5 PERCENT $Cr_2(SO_4)_3$ ADDITION

The rutile was additioned with 0.860 gm hydrated $Cr_2(SO_4)_3$ equivalent to 0.5 percent as anhydrous salt.

Experimental procedure and conditions of example 1 were maintained throughout the experiment which lasted 73 minutes, 242 gm $Cl_2$ being passed at a mean rate of 1.120 l.p.m. Mean values of $Cl_2$ utilization and CO ratio were 58.6 percent and 47.9 percent respectively. The results indicated marked beneficial effects on chlorination rate and on the CO ratio.

EXAMPLE 8 - 0.5 PERCENT $K_2CrO_4$ ADDITION

The rutile was additioned with 0.500 gm $K_2CrO_4$.

Experimental procedure and conditions of example 1 were maintained throughout the experiment lasting 76 minutes, during which 248 gm $Cl_2$ was passed at a mean rate of 1.102 l.p.m. Mean values of $Cl_2$ utilization and CO ratio were 54.8 percent and 47.6 percent respectively. The results showed particularly beneficial effects in the initial stages.

EXAMPLE 9 - 0.5 PERCENT $K_2CO_3$ ADDITION

The rutile was additioned with 0.500 gm $K_2CO_3$.

Experimental procedure and conditions of example 1 were maintained throughout the experiment lasting 80 minutes, during which 263 gm $Cl_2$ was passed at a mean rate of 1.111 l.p.m. Mean values of $Cl_2$ utilization and CO ratio were 53.5 percent and 57.8 percent respectively. While the data shows only slight effect on the CO ratio, the rate of chlorination is increased by about 50 percent in the early stages.

EXAMPLE 10 - 0.10 PERCENT $LaCl_3$ ADDITION

The rutile was "wet" additioned with 0.10 gm $LaCl_3$ and dried.

The experimental procedure and conditions of example 1 were maintained in an experiment lasting 70 minutes during which 224 gm $Cl_2$ was passed at a mean rate of 1.081 l.p.m. Mean values of $Cl_2$ utilization and CO ratio were 59.3 percent and 47.0 percent respectively. The result showed that $LaCl_3$ had a marked effect on both the rate of chlorination and on the CO ratio.

I claim:

1. In a process for chlorinating a finely divided titaniferous material at least 30 percent by weight of which has a particle size greater than 180 microns in a fluidized bed in the presence of a carbonaceous reducing agent, the improvement comprising increasing the efficiency of chlorination, as measured by the chlorine utilization or CO ratio of the gases produced in the chlorination reaction, by conducting the chlorination in the presence of an added source of an element selected from the group consisting of chromium, lanthanum, and vanadium, in an amount of from 0.01 to 2.5 percent by weight expressed as the additive element based on the weight of titanium dioxide in the titaniferous material.

2. The process of claim 1 wherein the added source is lanthanum.

3. The process of claim 1 wherein the added source is vanadium.

4. The process of claim 1 wherein the added source is present in an amount of from 0.025% to 1.0% by weight expressed as the additive element based on the weight of the titanium dioxide in the titaniferous material.

5. The process of claim 4 wherein the source is chromium.

6. The process of claim 1 wherein at least 40% by weight of the titaniferous material has a particle size greater than 180 microns.

7. The process of claim 1 wherein the titaniferous material contains at least 85% of titanium dioxide by weight.

8. In a process for chlorinating a finely-divided titaniferous material at least 30 percent by weight of which has a particle size greater than 180 microns, in a fluidized bed in the presence of a carbonaceous reducing agent, the improvement comprising increasing the efficiency of chlorination, as measured by the chlorine utilization or CO ratio of the gases produced in the chlorination reaction, by conducting the chlorination in the presence of an added source of an element selected from the group consisting of chromium, lanthanum and vanadium, in an amount of from 0.01 to 2.5 percent by weight expressed as the additive element based on the weight of titanium dioxide in the titaniferous material, and in the presence of an auxiliary added source of an element selected from the group consisting of calcium, manganese and cerium, in an amount of from 0.01 to 2.5 percent by weight expressed as the additive element based on the weight of the titanium dioxide in the titaniferous material.

9. The process of claim 8 wherein the auxiliary added source is selected from the group consisting of cerium and manganese.

10. The process of claim 8 wherein the added source is chromium.

11. The process of claim 1 wherein the carbonaceous reducing agent in solid in form.

12. The process of claim 11 wherein the reducing agent is coke.

13. The process of claim 8 wherein the carbonaceous reducing agent is solid in form.

14. The process of claim 13 wherein said reducing agent is coke.

15. In a process for chlorinating a finely-divided titaniferous material, at least 30 percent by weight of which has a particle size greater than 180 microns, in a fluidized bed in the presence of a carbonaceous reducing agent, the improvement comprising increasing the efficiency of chlorination, as measured by the chlorine utilization or CO ratio of the gases produced in the chlorination reaction, by conducting the chlorination in the presence of an added source of the element chromium in an amount of from 0.01 to 2.5 percent by weight expressed as the additive element based on the weight of titanium dioxide in the titaniferous material.

16. In a process for chlorinating a finely-divided titaniferous material, at least 30 percent by weight of which has a particle size greater than 180 microns, in a fluidized bed in the presence of a carbonaceous reducing agent, the improvement comprising increasing the efficiency of chlorination, as measured by the chlorine utilization or CO ratio of the gases produced in the chlorination reaction, by conducting the chlorination in the presence of an added source of the element chromium in an amount of from 0.01 to 2.5 percent by weight expressed as the additive element based on the weight of titanium dioxide in the titaniferous material, and in the presence of an auxiliary added source of the element calcium in an amount of from 0.01 to 2.5 percent by weight expressed as the additive element based on the weight of the titanium dioxide in the titaniferous material.

17. The process of claim 15 wherein the chromium is added in amount of from 0.025 to 0.5 percent by weight in the form of chromite ore.

* * * * *